US007873462B2

(12) United States Patent
Bischoff et al.

(10) Patent No.: US 7,873,462 B2
(45) Date of Patent: Jan. 18, 2011

(54) METHOD AND DEVICE FOR AIR PILOT CONTROL IN SPEED-CONTROLLED INTERNAL COMBUSTION ENGINES

(75) Inventors: Bjoern Bischoff, Korntal-Muenchingen (DE); Horst Wagner, Niederstotzingen (DE); Brahim Baqasse, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 220 days.

(21) Appl. No.: 12/335,273

(22) Filed: Dec. 15, 2008

(65) Prior Publication Data

US 2009/0228186 A1 Sep. 10, 2009

(30) Foreign Application Priority Data

Mar. 4, 2008 (DE) ...................... 10 2008 012 547

(51) Int. Cl.
*G06F 19/00* (2006.01)
*F02P 5/00* (2006.01)

(52) U.S. Cl. .................................. 701/110; 123/406.23

(58) Field of Classification Search ................. 701/103, 701/110; 123/406.11, 406.16, 406.23, 406.24; 73/114.25, 114.32, 114.62, 114.63
See application file for complete search history.

(56) References Cited

U.S. PATENT DOCUMENTS

| | | | | |
|---|---|---|---|---|
| 6,893,377 | B2 * | 5/2005 | Hartmann et al. | 477/109 |
| 6,915,782 | B2 * | 7/2005 | Hanada et al. | 123/399 |
| 7,231,289 | B2 * | 6/2007 | Damitz et al. | 701/104 |
| 7,376,505 | B2 * | 5/2008 | Skala et al. | 701/110 |
| 7,574,298 | B2 * | 8/2009 | Morimoto et al. | 701/104 |
| 2001/0010215 | A1 * | 8/2001 | Kaltenbrunn et al. | 123/435 |
| 2008/0006236 | A1 * | 1/2008 | Yamashita et al. | 123/198 R |

* cited by examiner

*Primary Examiner*—John T Kwon
(74) *Attorney, Agent, or Firm*—Kenyon & Kenyon LLP

(57) ABSTRACT

A method for operating a speed-controlled internal combustion engine, including regulating the rotational speed of the internal combustion engine, information concerning a torque to be set being provided as a manipulated variable, limiting the manipulated variable according to a torque limiting value in order to obtain a limited manipulated variable, activating the internal combustion engine as a function of the limited manipulated variable, and increasing the air volume fed to the internal combustion engine for achieving the torque to be set irrespective of the torque limiting value.

9 Claims, 4 Drawing Sheets

METHOD AND DEVICE FOR AIR PILOT CONTROL IN SPEED-CONTROLLED INTERNAL COMBUSTION ENGINES

CROSS-REFERENCE

This application claims the benefit under 13 U.S.C. §119 of German Patent Application No. 102008012547.4, filed on Mar. 4, 2008, which is expressly incorporated herein by reference in its entirety.

FIELD OF THE INVENTION

The present invention relates to the control of the supplied air volume for internal combustion engines in speed-controlled internal combustion engines, which are used for example for activating hydraulic systems or pumps.

BACKGROUND INFORMATION

In conventional internal combustion engines used for the propulsion of motor vehicles and the like, the setpoint values for the air system (air flow, charge pressure, exhaust gas recirculation rate and the like) are derived from the torque request or the quantity of fuel injected. In order to compensate for the relatively sluggish behavior of the air system, the setpoint torque request is used without limitation for activating the air system in torque-controlled or volume-controlled structures.

In speed-controlled systems, such as those used, for example, for driving pumps or hydraulic devices, no possibility has been provided as yet for generating a dynamic torque backup or torque reserve for the air system that has as little influence as possible on the efficiency of the engine system. Recent or modern combustion designs having a high exhaust gas recirculation rate reduce the air provided in the intake manifold and the resulting, steadily prevailing torque reserve is reduced. Therefore, greater torque increases of the speed control cannot be implemented rapidly.

SUMMARY

An object of the present invention is to provide a speed-controlled internal combustion engine system in such a way that it is also possible to implement greater torque changes in the internal combustion engine system for stabilizing the rotational speed.

According to a first aspect of the present invention, a method for operating a speed-controlled internal combustion engine, in particular a self-igniting internal combustion engine, is provided. The example method has the following steps:

- regulating the rotational speed of the internal combustion engine, information concerning a torque to be set being provided as a manipulated variable;
- limiting the manipulated variable according to a torque limiting value in order to obtain a limited manipulated variable;
- activating the internal combustion engine as a function of the limited manipulated variable;
- increasing the air volume fed to the internal combustion engine for achieving the torque to be set irrespective of the torque limiting value.

In the above example method, the internal combustion engine and the air system of the internal combustion engine are activated separately. When a high torque is requested by the regulation in the presence of substantial differences in rotational speed, this is limited by a torque limiting value which is used, e.g., for engine protection, or it specifies allowable control limits corresponding to the instantaneous air charge of the air system. The air system of the internal combustion engine is, however, activated in such a way that an air volume required for achieving the torque to be set is provided directly to the internal combustion engine, while the internal combustion engine is only activated using the engine variables corresponding to the limited torque, e.g., quantity of fuel injected, injection angle, ignition point and the like. This means that the air system is activated in such a way that an air charge, which is needed by the internal combustion engine for providing the torque to be set resulting from the regulation, is set directly irrespective of the torque limiting value, i.e., as quickly as possible.

A basic concept in this is that the system deviation of the rotational speed regulation is used as a criterion for calculating an additional activation of the air system (air pilot control). This means that if the rotational speed regulation requests a high actuating torque, not only engine parameters such as quantity of fuel injected, injection time and the like are adjusted to provide a higher torque, but also the air volume provided becomes active, i.e., adjusted as a function of the state of the regulation. In contrast with a permanent application of a comparatively low additional air volume, the so-called air reserve, to the instantaneous air volume which has been carried out to date, this has the advantage that the torque necessary for compensating for the system deviation may be provided as fast as possible. In this connection, a relatively slow increase in torque due to the air volume being limited to the size of the air reserve in the air system during a plurality of cycles of successive adjustments may be eliminated.

In steady-state operation, i.e., no changes in setpoint rotational speed or load occur, the air volume to be held in reserve corresponds to the requested amount of torque, permitting an optimal engine design with respect to exhaust gas and efficiency for steady-state operation.

If the setpoint value for rotational speed is increased, additional torque is needed to accelerate the engine. The system deviation resulting from the change in setpoint value (the manipulated variable is the requested torque) may be used as a control variable for an air pilot control so that the air volume provided in the intake manifold is set as a function of the system deviation.

An increased engine load also results in a positive system deviation which, corresponding to the above case of increasing the setpoint rotational speed, is used for a rapid buildup of the air flow.

The air pilot control in the air supply does not directly produce torque but instead exclusively influences the control limits of the rotational speed regulation. It is thus possible for high positive torque changes to be performed by increasing the quantity of fuel injected without causing instabilities in the rotational speed regulation. If a suitable selection of air pilot control is made, the rotational speed regulator will reset an emission-optimal air-fuel ratio by utilizing its torque intervention.

According to one specific embodiment, the air system of the internal combustion engine may be activated as a function of the manipulated variable.

As an alternative, the air system of the internal combustion engine may be activated as a function of a result of a torque estimate performed by the regulation so that the air volume is set as a function of an estimated instantaneous load torque.

Furthermore, the torque limiting value may be determined as a function of the instantaneous air volume in the air system and/or by a limit torque which specifies a mechanical and/or thermal load limit of the internal combustion engine.

In a first operating mode of the internal combustion engine, the air system may also be activated in such a way that the air volume necessary for achieving the torque to be set is supplied to the internal combustion engine, and, in another operating mode of the internal combustion engine, the air volume is set in such a way that it contains a specified air reserve in addition to the air volume currently provided by the air system, it being possible to switch between the first and the second operating mode as a function of a control signal.

According to a further aspect, an engine control unit is provided for operating a speed-controlled internal combustion engine. The example engine control unit includes:

- a device for performing a regulation of the rotational speed of the internal combustion engine, information concerning a torque to be set being provided as a manipulated variable;
- a limiting element for limiting the manipulated variable according to a torque limiting value in order to obtain a limited manipulated variable;
- a device for activating the internal combustion engine as a function of the limited manipulated variable;
- a device for increasing the air volume fed to the internal combustion engine for achieving the torque to be set irrespective of the torque limiting value.

Furthermore, a changeover switch may be provided in order to activate the air system in a first operating mode of the internal combustion engine as a function of a control signal in such a way that the air volume necessary for achieving the torque to be set is supplied to the internal combustion engine and in order to set the air volume in another operating mode of the internal combustion engine in such a way that it contains an established air reserve in addition to the air volume currently provided by the air system.

According to a further aspect, an example computer program is provided which contains a program code that, when executed in an engine control unit, implements the above method.

BRIEF DESCRIPTION OF THE DRAWINGS

Preferred specific embodiments of the present invention are explained below with reference to the figures.

DETAILED DESCRIPTION OF EXAMPLE EMBODIMENTS

Figure 1:
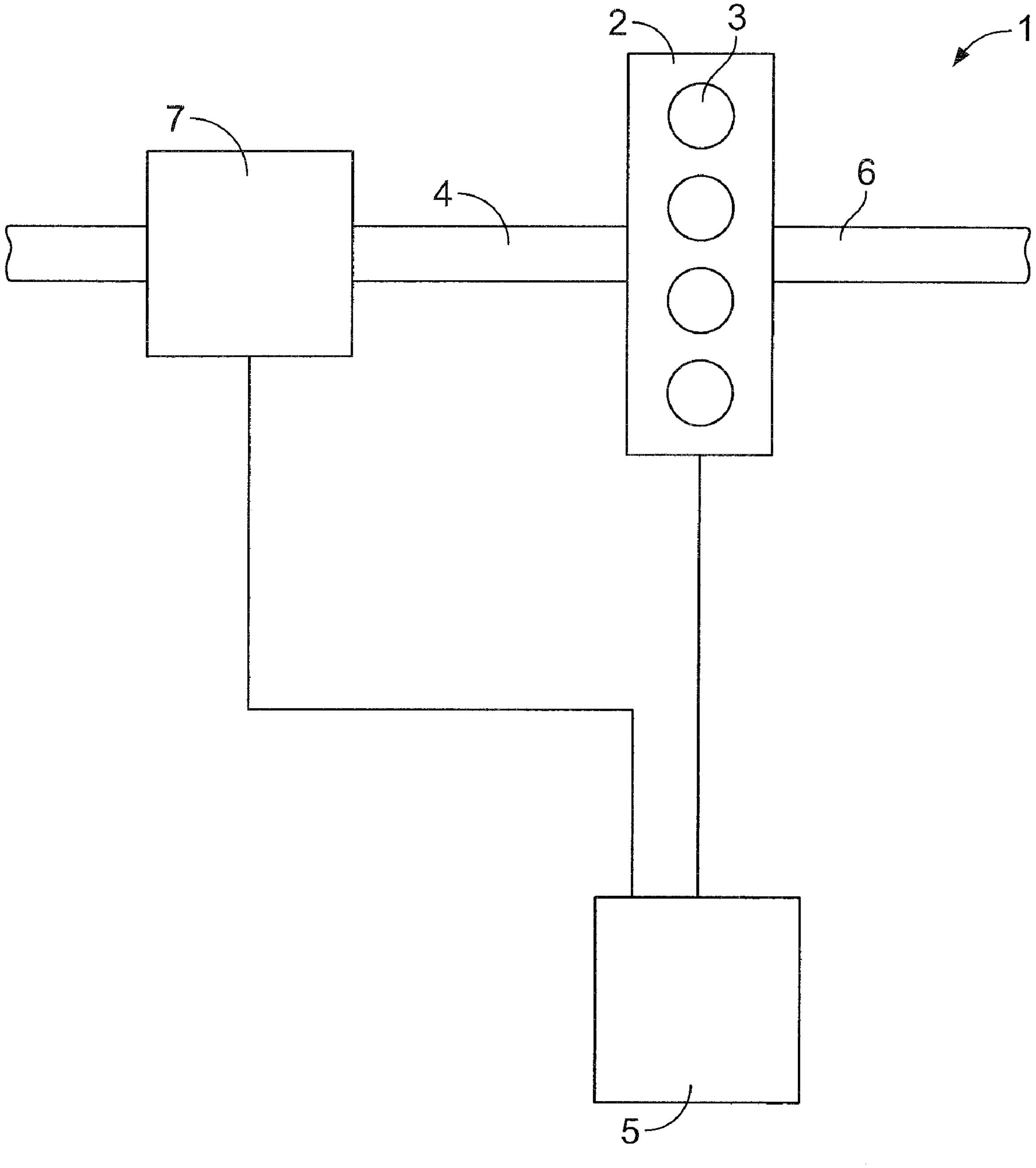
FIG. 1 shows a schematic representation of a speed-controlled engine system according to one specific embodiment of the present invention.

An engine system 1 is shown schematically in FIG. 1. The engine system of FIG. 1 includes an internal combustion engine 2 having a plurality of cylinders 3, to which air may be supplied via an intake manifold 4. Controlled by an engine control unit 5, fuel is injected directly into cylinders 3 (as in the case of a diesel engine, for example) or alternatively into a segment of the intake manifold assigned to cylinders 3 in order to operate internal combustion engine 2. The combustion exhaust gases are discharged from cylinders 3 via an exhaust system 6. A specific air volume or a specific air pressure is set in intake manifold 4 by a charging device 7, such as a turbocharger, which is activated by engine control unit 5. Alternatively, the air volume to be provided may also be set by the position of a throttle valve or by an exhaust gas recirculation system. Internal combustion engine 2 may be designed as a diesel engine or a gasoline engine.

Engine control unit 5 thus controls the air volume flowing into cylinders 3 by setting a pressure in the air system, such as the intake manifold pressure using charging device 7, the quantity of fuel injected, the injection time, and other engine variables of the engine system. Engine system 1 shown is a speed-controlled engine system (i.e., the rotational speed of internal combustion engine 2 is regulated to a predefined setpoint rotational speed).

Figure 2:
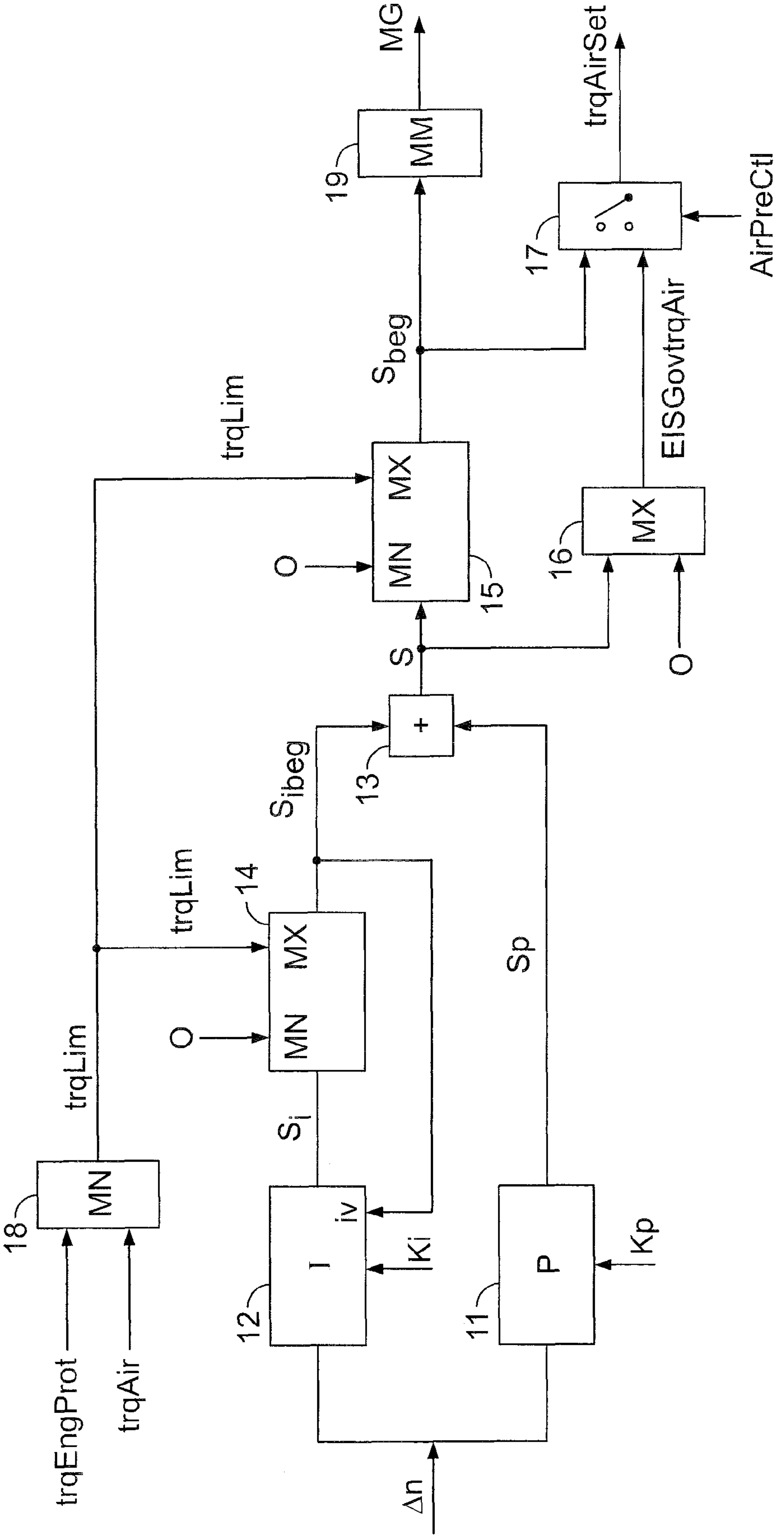
FIG. 2 shows a block diagram for illustrating the function of activating the internal combustion engine.

FIG. 2 illustrates the function of the rotational speed regulation including an air pilot control according to one specific example embodiment.

A distinction is made between the terms “air reserve” and “air pilot control” in the following. The term “air reserve” describes the differential air volume by which the air volume actually needed for the currently required torque of internal combustion engine 2 is increased in order to be able to implement slight accelerations or slight or quasi-steady-state system deviations. The air reserve may, for example, amount to an air volume which corresponds to between 2% and 10% of the air volume needed for the instantaneous torque or which corresponds to a predetermined constant air volume.

The “air pilot control” is also a differential air volume which is provided as an alternative or in addition to the air reserve in the event of a significant system deviation that is, for example, above a limiting value predefined by the air reserve, for example. However, the differential air volume of the air pilot control does not depend on the air volume needed for the instantaneous torque but is instead provided as a function of a requested torque change in addition to the air volume needed for the instantaneous torque. As a result, the air pilot control ensures a rapid increase in the air charge in cylinders 3 of internal combustion engine 2.

Function blocks P, I of a PI controller according to one specific example embodiment are shown schematically in FIG. 2. A rotational speed difference Δn is used as an input variable of the PI controller for implementing a rotational speed regulation for internal combustion engine 2 of FIG. 1, rotational speed difference Δn being derived from the difference between a setpoint rotational speed, which is predefined and is to be set, and an actual rotational speed, which corresponds to the instantaneous, e.g., measured rotational speed n of internal combustion engine 2. Corresponding information stating rotational speed difference Δn is supplied to both a proportional element 11 and an integration element 12. Proportional element 11 multiplies rotational speed difference Δn by a proportional factor Kp and supplies resulting proportional component $S_p$ of the control value to a summing element 13. Integration element 12 integrates rotational speed difference Δn as a function of an integration factor ki and feeds integration component $S_i$ of the control value resulting therefrom to a first limiting element 14. First limiting element 14 limits integration component $S_i$ of the control value to a range between zero 0 (Mn input) and a limiting value trqLim (Mx input).

Thus, integration component $S_{ibeg}$ of the control value which is limited in this way is coupled back to an input iv of integration element 12. Coupling back the limited integration component may prevent the integration value of integration element 12 from running up in a positive or negative direction, which would substantially delay a response if the sign of the rotational speed difference were to change. Coupling back limited control value $S_i$ of the integration component to integration element 12 ensures that integration value I in integration element 12 is always between the limits predefined by first limiting element 14 at the start of regulation cycles. If integration value I of integration element 12 drops below zero, integration value I is reset to zero. If the integration value exceeds trqLim, integration value I is set to trqLim. Integration value I may be adjusted according to a regulation cycle based on the regulation regularly, periodically or at predefined points in time.

Limited integration component $S_{ibeg}$ of the control value is also supplied to summing element 13. As a function of proportional component $S_p$ and integration component $S_{ibeg}$ of the control value, a manipulated variable S is output by summing element 13. Manipulated variable S represents a control torque which is again limited in a second limiting element 15 to the range between zero 0 (Mn input) and limiting value trqLim (Mx input) in order to obtain a limited manipulated variable $S_{beg}$. Limited manipulated variable $S_{beg}$ is supplied to an engine model MM 19 which converts limited manipulated variable $S_{beg}$ into engine variables MG for activating internal combustion engine 2. Engine variables MG may be, for example, quantity of fuel injected, injection time and the like.

Limiting value trqLim is dependent on the instantaneous air charge of the cylinders and is thus dependent on the charge pressure, the throttle valve position, the exhaust gas recirculation rate or the like. In other words, limiting value trqLim is dependent on the state of the air system. As a result, limiting value trqLim specifies which maximum manipulated variable may be requested by the rotational speed regulation in the instantaneous state of the air system.

Heretofore, it has been provided that an air reserve is set depending on the requested manipulated variable so that an air volume is made available to the internal combustion engine which exceeds the air volume needed to provide the instantaneous torque by a specific amount. For example, the air reserve may be between 2% and 10% of the air volume necessary for providing the instantaneous torque. Via limiting value trqLim, the air reserve in turn determines the maximum manipulated variable $S_{beg}$ which may be requested by internal combustion engine 2. Any increase in the air reserve is often not expedient because power of internal combustion engine 2 is needed for providing the air reserve, e.g., using charging device 7, such as a turbocharger, thus increasing the fuel consumption. The setting of the amount of the air reserve must thus be weighed against increased fuel consumption. Establishing the air reserve thus represents a compromise between the smallest possible increase in fuel consumption of the internal combustion engine and a sufficiently rapid torque adjustment when a torque change is requested.

The air reserve determines the speed at which a torque change requested via manipulated variable S may be carried out because limiting value trqLim and the particular instantaneous air charge (air volume present in the intake manifold) depend on one another. Because limiting value trqLim limits manipulated variable S, and limiting value trqLim is in turn dependent on the instantaneous air charge which is oriented to the operating point of internal combustion engine 2, the torque provided by internal combustion engine 2 in each regulation cycle may only increase by a maximum of an amount determined by the air reserve provided. In other words, the torque in each regulation cycle may only increase to the extent allowed by the air reserve added to the currently needed air volume.

The torque change thus made possible is, however, too slow in some applications if the load torque change occurs suddenly or if the setpoint rotational speed changes. Therefore, an air pilot control is provided which, in the event of a significant system deviation, is not implemented as for the setting of the air reserve as a function of limited manipulated variable $S_{beg}$, but instead as a function of non-limited manipulated variable S which is picked off at the input of second limiting element 15.

This manipulated variable S specifies the torque that would be requested to operate the rotational speed regulation in a manner not limited by the limiting value. Manipulated variable S is subsequently limited only because internal combustion engine 2 is not able to or should not convert manipulated variable S into a corresponding torque in the instantaneous state. For setting the air volume in the air system, non-limited manipulated variable S is supplied to a maximum element 16 which is only able to pass on positive manipulated variables S as control variable EISGov_trqAir for the air system and outputs a zero as EISGov_trqAir instead of negative control variables. The reason for this is that negative control torques need not be actively implemented by an air reserve or an air pilot control because in this case an excess air volume in the intake manifold is not a hindrance for a torque of the internal combustion engine that is to be reduced and the torque may be reduced by reducing the quantity of fuel injected.

Control variable EISGov_trqAir is then used to make available a corresponding air pilot control, i.e., a provision of an additional air volume in intake manifold 4, which enables internal combustion engine 2 to provide any control torque according to the non-limited manipulated variable as quickly as possible. This means that although internal combustion engine 2 is activated according to the limited manipulated variable, which is oriented to the instantaneous air charge, the air charge is not set as a function of the instantaneous engine operating state (through the air reserve) but instead as a function of manipulated variable S, which results in the torque that internal combustion engine 2 is to provide as quickly as possible for implementing the rotational speed regulation. The additional air volume in the air system is, for example, provided by activating the charging device in an appropriate manner in order to increase the intake manifold pressure to a value corresponding to the control variable. Alternatively or in addition, the additional air volume in the air system may also be provided by setting a throttle valve and/or the exhaust gas recirculation rate.

It may also be provided that a changeover switch 17 is used to operate the rotational speed regulation in two operating modes, namely in the conventional operating mode in which no air pilot control is performed, i.e., the air charge is set as a function of the instantaneous operating state of internal combustion engine 2 according to a requested air volume and an air reserve and in a second operating mode in which an air pilot control is provided and in which the air charge is set corresponding to the non-limited manipulated variable desired by the rotational speed regulation. Changeover switch 17 is activated using a predefined activation signal AirPreCtl.

Limited manipulated variable $S_{beg}$ is ascertained as a result of the limitation in second limiting element 15. Limiting variable trqLim is, for example, further limited according to predefined limiting values. An example of such a limiting value is, for example, a mechanical-thermal limit torque trqEngProt which is used to prevent the torque requested by internal combustion engine 2 from resulting in a mechanical or thermal overload of internal combustion engine 2. Furthermore, an additional limit torque trqAir may be provided which specifies a maximum torque that may be delivered by the internal combustion engine in the presence of the instantaneous air charge. In a minimum element 18, the smaller of the two limiting values is selected and provided as limiting value trqLim.

A corresponding quantity of fuel injected is calculated from limited manipulated variable $S_{beg}$ in the engine controller according to engine model MM 19 as engine variable MG and the ignition angle (in gasoline engines) or the injection time (diesel engines) is adjusted accordingly if necessary. The air system uses the manipulated variable selected as a function of the position of changeover switch 17 for the air pilot control or for the air reserve as variable trqAirSet in order to ascertain the setpoint values to be set for the charge pressure and/or for the throttle valve position and/or for the exhaust gas recirculation.

Figure 3:
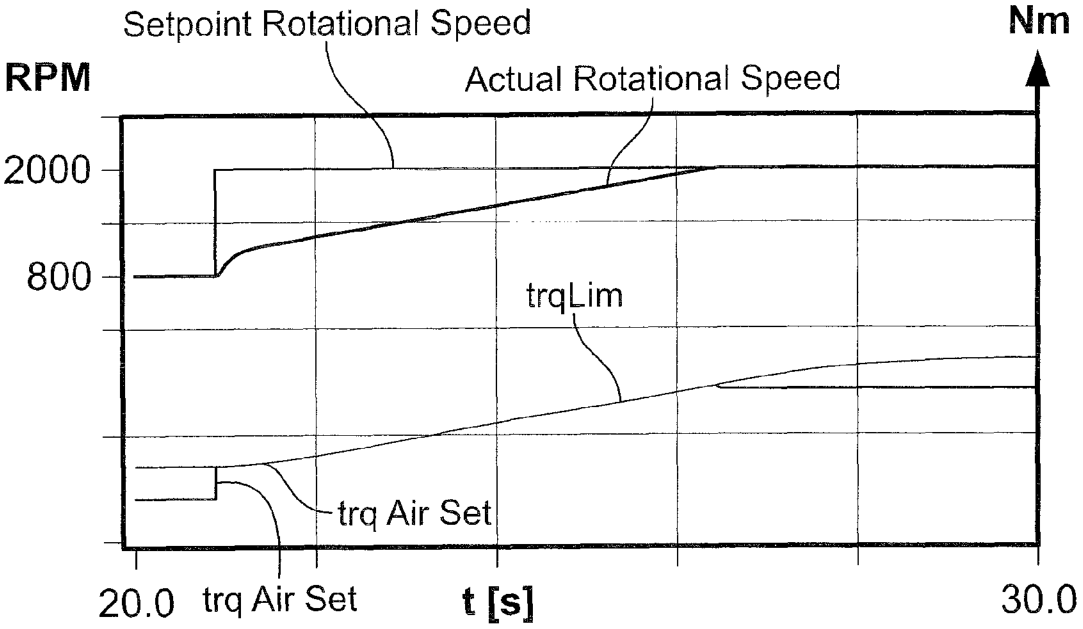
FIG. 3 shows a diagram for illustrating the system response to a change in the setpoint rotational speed in a conventional system.

FIG. 3 shows a diagram that represents the behavior of a speed-controlled internal combustion engine in the event of an abrupt change in the setpoint rotational speed from 800 rpm to 2000 rpm. In steady-state operation, an air reserve of 30 Nm is implemented, i.e., the air reserve corresponds to an air volume that makes it possible to implement a torque change of a maximum of 30 Nm by a corresponding change in the quantity of fuel injected. Because of the setpoint value change, the air reserve is used up and the rotational speed regulator accelerates the engine utilizing maximum possible limiting torque trqLim. Due to the low air reserve and the sluggishness of the air system, the charge increases only slowly and the rotational speed regulator needs more than 5 seconds to set the new setpoint value at 2000 rpm.

Figure 4:
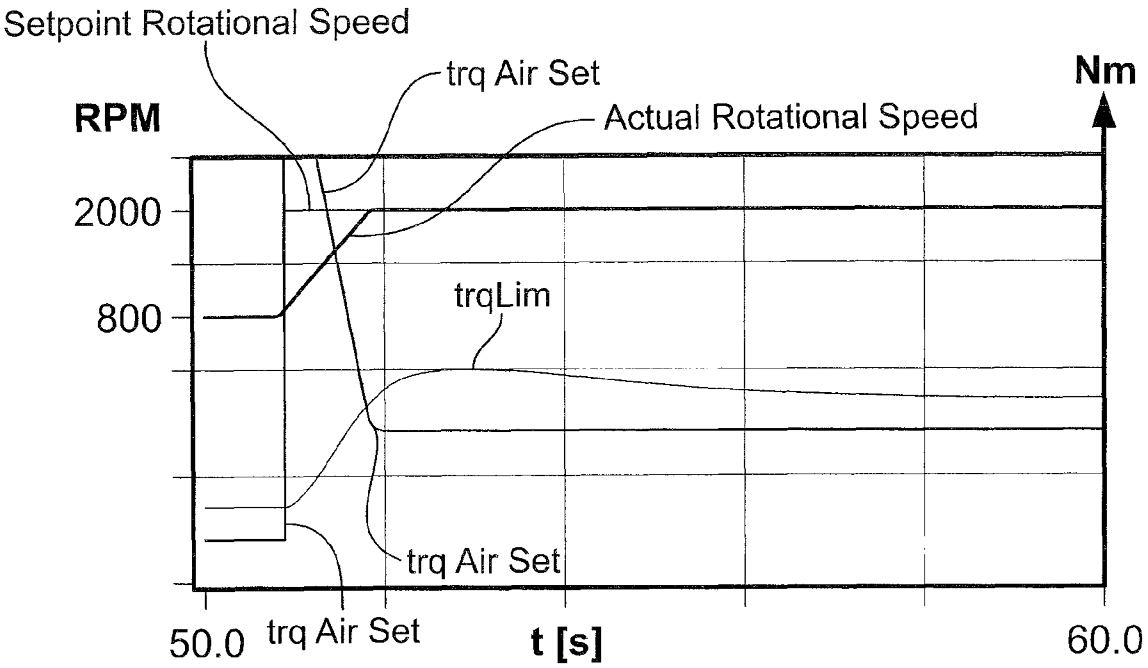
FIG. 4 shows a diagram for illustrating the system response to a setpoint rotational speed increase when implementing the functionality of FIG. 2.

FIG. 4 shows a diagram for illustrating the system response according the example method of the present invention, i.e., using an air pilot control in the same operating case as in FIG. 3. Simultaneous with the setpoint rotational speed increase, air pilot control trqAirSet assumes high values. These result in an immediate increase in the air volume available in the air system beyond the amount of the air reserve. The increased air volume makes it possible for limiting torque trqLim to increase rapidly. The rotational speed regulator is then able to fully exploit the control limit in order to accelerate internal combustion engine 2 in a suitable manner. As a result, the new setpoint value at 2000 rpm is reached after just 1 second.

Figure 5:
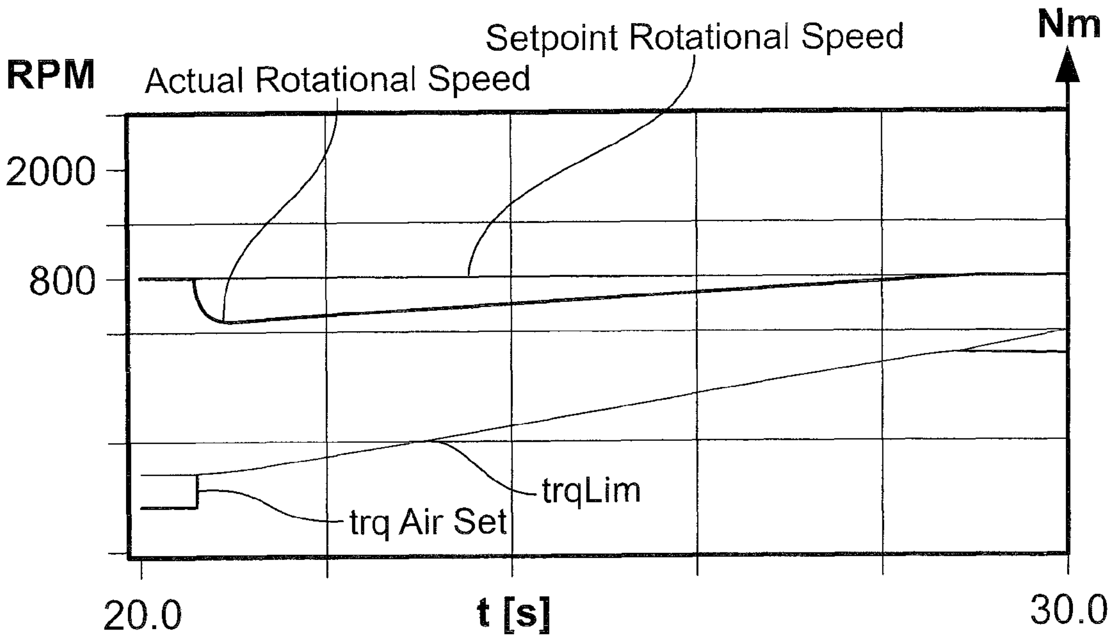
FIG. 5 shows a diagram of a system behavior when a disturbing torque is applied in a conventional system.
Figure 6:
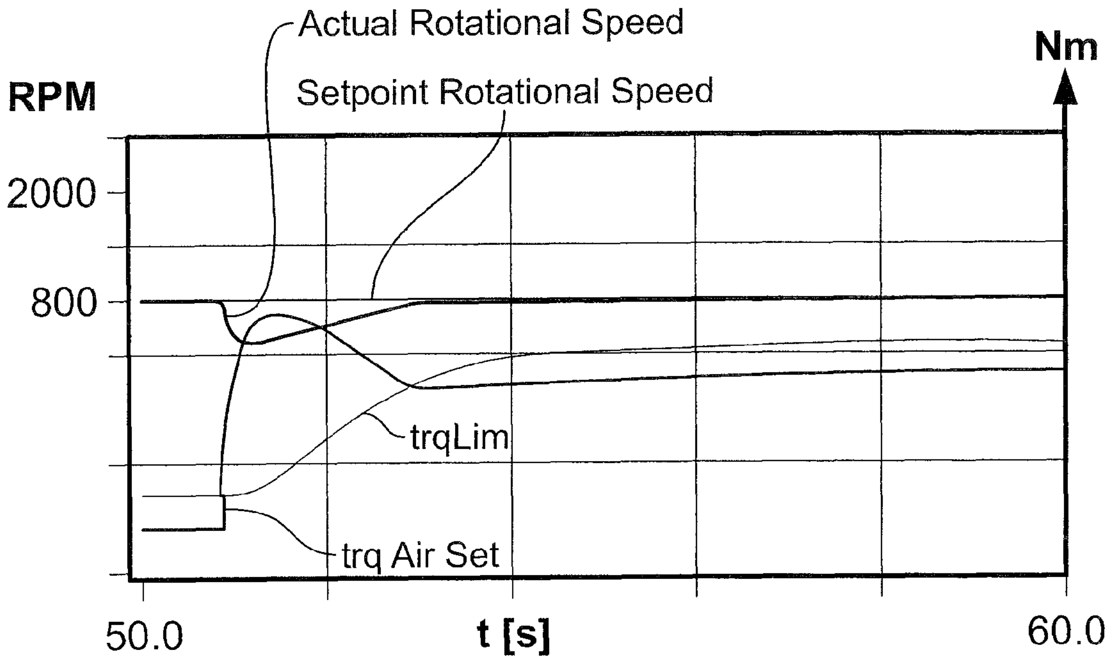
FIG. 6 shows a diagram for illustrating the system behavior when a disturbing torque is applied in an air pilot control of the functionality of FIG. 2.

FIG. 5 shows a diagram for illustrating the system behavior when a non-measurable, abrupt disturbing torque in the amount of approximately 100 Nm is applied. The disturbance results in a drop in rotational speed which is eliminated in a steady state by the rotational speed regulator. To this end, the rotational speed regulator increases its intervention up to control limit trqLim. In a system without air pilot control, the elimination of the disturbance requires approximately 8 seconds; in the implementation according to the present invention using air pilot control (see FIG. 6), the disturbance is eliminated after just 2 seconds.

According to another specific example embodiment, the air pilot control may also be replaced by an estimated load torque of an additionally provided conventional load torque estimate, instead of from the system deviation of the rotational speed regulation, i.e., as a function of the resulting manipulated variable. The load torque estimate is based on an evaluation of all torques occurring in the drive train. It is then possible to calculate a torque intervention on the drive train from the estimated load torque, which is to be compensated by internal combustion engine 2. Instead of the manipulated variable, the air pilot control is able to provide information concerning the torque change so that the necessary air charge is established as fast as possible corresponding to the requested torque change.

Instead of control torque S, a separate regulation, e.g., a separate P-component, or a characteristic curve may also be used for determining the control torque needed for the air pilot control. This means that, independent of the rotational speed regulation for determining the manipulated variable determining the control torque which is used by engine model 19 to determine the engine variables, a pilot control manipulated variable independent of the manipulated variable of the rotational speed regulator may be ascertained for the air system in a separate regulation. This means that control variable EisGov_trqAir is not derived from manipulated variable S output by summing element 13 but instead directly from rotational speed difference Δn as in the load torque estimate.

What is claimed is:

1. A method for operating a speed-controlled self-igniting internal combustion engine, comprising:

regulating a rotational speed of the internal combustion engine, information concerning a torque to be set being provided as a manipulated variable;

limiting the manipulated variable according to a torque limiting value in order to obtain a limited manipulated variable;

activating the internal combustion engine as a function of the limited manipulated variable; and increasing an air volume fed to the internal combustion engine for achieving the torque to be set irrespective of the torque limiting value.

2. The method as recited in claim 1, wherein an air system of the internal combustion engine is activated as a function of the manipulated variable.

3. The method as recited in claim 1, wherein an air system of the internal combustion engine is activated as a function of a result of a separately performed load torque estimate so that the air volume is set as a function of an estimated instantaneous load torque.

4. The method as recited in claim 3, wherein the torque limiting value is determined at least one of: i) as a function of an instantaneous air volume in the air system, and ii) by a limit torque which specifies a mechanical or thermal load limit of the internal combustion engine.

5. The method as recited in claim 1, wherein, in a first operating mode of the internal combustion engine, an air system is activated in such a way that the air volume necessary for achieving a torque to be set is supplied to the internal combustion engine, and, in another operating mode of the internal combustion engine, the air volume is set in such a way that it contains an established air reserve in addition to the instantaneous air volume provided by the air system, the internal combustion engine switching between the first and the second operating mode as a function of a control signal.

6. The method as recited in claim 1, wherein the internal combustion engine is activated by setting at least one variable, the at least one variable including at least one of quantity of fuel injected, injection time and ignition angle.

7. An engine control unit for operating a speed-controlled internal combustion engine, comprising:

a device adapted to perform a regulation of the rotational speed of the internal combustion engine, information concerning a torque to be set being provided as a manipulated variable;

a limiting element adapted to limit the manipulated variable according to a torque limiting value in order to obtain a limited manipulated variable;

a device adapted to activate the internal combustion engine as a function of the limited manipulated variable; and a device adapted to increase an air volume fed to the internal combustion engine for achieving the torque to be set irrespective of the torque limiting value.

8. The engine control unit as recited in claim 6, further comprising:

a changeover switch adapted to activate an air system in a first operating mode of the internal combustion engine as a function of a control signal in such a way that the air volume necessary for achieving a torque to be set is supplied to the internal combustion engine, and to set the air volume in another operating mode of the internal combustion engine in such a way that it contains an established air reserve in addition to an instantaneous air volume provided by the air system.

9. A memory device storing a computer program, the computer program, when executed by a computer, causing the computer to perform the steps of:

regulating a rotational speed of an internal combustion engine, information concerning a torque to be set being provided as a manipulated variable;

limiting the manipulated variable according to a torque limiting value in order to obtain a limited manipulated variable;

activating the internal combustion engine as a function of the limited manipulated variable; and increasing an air volume fed to the internal combustion engine for achieving the torque to be set irrespective of the torque limiting value.

* * * * *